United States Patent
Lee et al.

(10) Patent No.: US 8,484,323 B2
(45) Date of Patent: Jul. 9, 2013

(54) NETWORK SYSTEM CONNECTED WITH MULTIPLE MASTER DEVICES AND METHOD FOR OPERATING THE SAME

(75) Inventors: Sang Kyun Lee, Kyungki-do (KR); Hyung Taik Im, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 569 days.

(21) Appl. No.: 10/702,462

(22) Filed: Nov. 7, 2003

(65) Prior Publication Data
US 2004/0111501 A1 Jun. 10, 2004

(30) Foreign Application Priority Data
Dec. 6, 2002 (KR) .................. 10-2002-0077500

(51) Int. Cl.
G06F 15/177 (2006.01)
G06F 15/173 (2006.01)

(52) U.S. Cl.
USPC .......................... 709/222; 709/224; 709/225

(58) Field of Classification Search
USPC ......................... 709/222, 225, 224
See application file for complete search history.

(56) References Cited

U.S. PATENT DOCUMENTS

| | | | | |
|---|---|---|---|---|
| 5,754,799 | A * | 5/1998 | Hiles ............................... | 710/110 |
| 6,009,479 | A * | 12/1999 | Jeffries ............................. | 710/8 |
| 6,085,236 | A * | 7/2000 | Lea ................................. | 709/220 |
| 6,098,098 | A * | 8/2000 | Sandahl et al. ................ | 709/221 |
| 6,865,596 | B1 * | 3/2005 | Barber et al. .................. | 709/208 |
| 6,970,961 | B1 * | 11/2005 | Heitkamp et al. ............. | 710/110 |
| 7,031,294 | B2 * | 4/2006 | Aiello et al. ................... | 370/348 |
| 7,650,158 | B2 * | 1/2010 | Indirabhai ...................... | 455/502 |
| 2002/0055978 | A1 * | 5/2002 | Joon-Bo et al. ................ | 709/209 |
| 2003/0005100 | A1 * | 1/2003 | Barnard et al. ................ | 709/223 |
| 2003/0054821 | A1 * | 3/2003 | Kita et al. ....................... | 455/435 |
| 2004/0073620 | A1 | 4/2004 | Roh et al. | |
| 2004/0103184 | A1 * | 5/2004 | Humpleman et al. ......... | 709/223 |
| 2004/0111496 | A1 | 6/2004 | Han et al. | |
| 2004/0133721 | A1 * | 7/2004 | Ellerbrock ..................... | 710/104 |
| 2007/0042807 | A1 * | 2/2007 | Khoo .............................. | 455/557 |

FOREIGN PATENT DOCUMENTS

JP   7-231329 A   8/1995

OTHER PUBLICATIONS

English language Abstract of JP 7-231329 A.

* cited by examiner

*Primary Examiner* — Umar Cheema
(74) *Attorney, Agent, or Firm* — Birch, Stewart, Kolasch & Birch, LLP

(57) ABSTRACT

A network system connected with one or more master devices and a method for operating the same. The system and method enable a new master device to be automatically connected to a network, when the network system is newly constructed or when the new master device is additionally connected to the network with which at least one master device has already been connected. A plurality of slave devices are connected to the network constructed within a building to transmit and receive data through the network. At least one master device controls the slave devices. A network manager automatically assigns a network address to the master device to appropriately connect the master device to the network when the master device is newly connected to the network or additionally connected to the network with which an existing master device is connected. Therefore, a network connection and a setting task associated with the master device are automatically performed, thereby easily and conveniently managing the network and hence reducing costs for managing the network.

5 Claims, 5 Drawing Sheets

NETWORK SYSTEM CONNECTED WITH MULTIPLE MASTER DEVICES AND METHOD FOR OPERATING THE SAME

CROSS-REFERENCE TO RELATED APPLICATION

The present application claims priority under 35 U.S.C. §119 of Korean Application No. 2002-77500, which was filed on Dec. 6, 2002, the disclosure of which is expressly incorporated by reference herein in its entirety.

BACKGROUND OF THE INVENTION

1. Field of the Invention

The present invention relates to a network system connected with multiple master devices and a method for operating the same. More particularly the present invention relates to a network system connected to multiple master devices and a method for operating the same, wherein a new master device can be automatically plugged into a network such that it can be easily installed and managed by the network, where the new master device is first connected with the network or is additionally connected to the network with which at least one existing master device is connected.

2. Description of the Related Art

Networks have been recently constructed within homes or buildings, and home appliances connected to such networks communicate data with other home appliances through the networks. Furthermore, the use of such home-appliance network systems capable of monitoring states of the home appliances and controlling the home appliances has increased.

Thus, through the above-described home-appliance network systems, a user can identify a state of a specific home appliance anywhere within the home and input a control command to the home appliance. Moreover, where the network constructed within the home is connected with an external Internet network, a range of control of the home-appliance network system can be extended. Hence the user can obtain the increased convenience of controlling the home appliances, in that the home appliances can be controlled by a remote control device.

The above-described home-appliance network system will be described with reference to FIGS. 1 and 2. FIG. 1 is a view illustrating the configuration of a conventional network system, and FIG. 2 is a view illustrating the configuration of a conventional network system connected with multiple master devices.

An internal network N, including a power line or a LAN (Local Area Network) line, is conventionally constructed within a home or building such that a home-appliance can form part of a network system. A plurality of home appliances are connected to the network N such that they can communicate data with the network N. A communication protocol of a home appliance is the same as that of the network N.

The home appliances connected to the internal network N are classified into master devices MA and slave devices SA. A master device MA receives information indicating states of the home appliances. A microcomputer (not shown) for carrying out signal processing and a display unit (not shown) are mounted on the master device MA such that the state information can be externally displayed. The master device MA further includes a key input unit (not shown) allowing a user to input a control command. For example, the master devices can be an Internet-based refrigerator, an air conditioner, a computer, etc. In the figures, the Internet-based refrigerator and the air conditioner are shown as the master devices in FIGS. 1 and 2.

Further, a network interface module is provided in the master device MA such that the master device MA can be connected with an external Internet network I. As the network N within the home and the external Internet network I are connected to each other, the home appliances can be remotely controlled by remote control devices C1 to Cn which are capable of accessing the Internet network.

Slave devices SA1 to SA4 are passive home appliances controlled in response to control commands that are input and/or transmitted through the master devices MA. For example, the slave devices SA1 to SA4 include a microwave oven, an electric light, a television, a telephone, etc.

Where a new master device MA is first connected to the network N indicated by a dotted line in FIG. 1, the conventional network system must carry out an initial setting task. This is needed for sending state information and connection state information, associated with the slave devices SA1 to SA4, such that the master device MA can identify all slave devices SA1 to SA4 connected to the network N. Because a worker has to be sent by a provider of the network N to manually perform the initial setting task there is a problem in that the user must request the provider of the network N to carry out a re-setting task for the master device MA, when an operating error of the master device and a communication error of the network N are detected after the initial setting. Moreover, there are problems of increased cost and waste of time for the re-setting task of the master device MA.

As the internal network N and the external Internet network I are connected to a master device MA1 having the network interface module connected to the external Internet network as shown in FIG. 2, the network system is constructed to control the home appliances connected to the internal network N using the remote control devices C1 to Cn. In the constructed network system, the existing master device MA1 is used as a first master device being a data processor connected to the network N and a master device MA2, newly connected to the network N, is used as a second master device such that a workload of data processing imposed on a master device is distributed between the two master devices MA1 and MA2. Where the network system connected with multiple master devices is used to control the slave devices SA1 to SA4 as described above, there is another problem in that internal setting tasks of the respective master devices become complex and hence an additional cost is incurred for the internal setting tasks.

In order for a replaceable home appliance to be connected to the network N in place of the existing master device MA1 connected to the network N, an operating system and user data associated with the existing master device MA1 must be transferred to the new master device MA2. Thus, the conventional network system causes the above described problems due to complex manual procedures.

SUMMARY OF THE INVENTION

Therefore, the present invention has been made in view of the above problems, and it is an object of the present invention to provide a network system connected with multiple master devices and a method for operating the same. The system and method can easily add and change a master device by enabling a new master device connected to a network constructed within a home to be automatically recognized, when the new master device is first connected with the network or additionally connected to the network with which at least one existing master device has already been connected.

In accordance with one aspect of the present invention, the above and other objects can be accomplished by the provision of a network system connected with multiple master devices, comprising: a plurality of slave devices connected to a network constructed within a building for transmitting and receiving data through the network; at least one master device for receiving a control command from a manager and outputting state information in response to the control command such that the slave devices can be controlled in a central control manner; and a network manager for automatically assigning a network address to the master device to plug the master device into the network where the master device is newly connected to the network or is additionally connected to the network with which an existing master device is connected.

In accordance with another aspect of the present invention, a method for operating a network system connected with multiple master devices, comprising connecting a new master device to a network with which a plurality of slave devices are connected; searching for a unique address associated with the master device; and notifying all home appliances connected to the network that the master device having the unique address has been appropriately plugged into the network.

In accordance with yet another aspect of the present invention, there is provided a method for operating a network system connected with multiple master devices, comprising connecting a new home appliance to a network with which a plurality of slave devices and an existing master device are connected; notifying all home appliances that the new home appliance has been plugged into the network by transmitting a unique address assigned to the new home appliance to the home appliances connected to the network; determining whether the new home appliance is a master device and transmitting, to the new home appliance, a data packet or some other appropriate form of communication containing state information of the home appliances connected to the network if the new home appliance is the master device; and if the existing master device connected with the network is used along with the new master device, transmitting the data packet to the existing master device.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
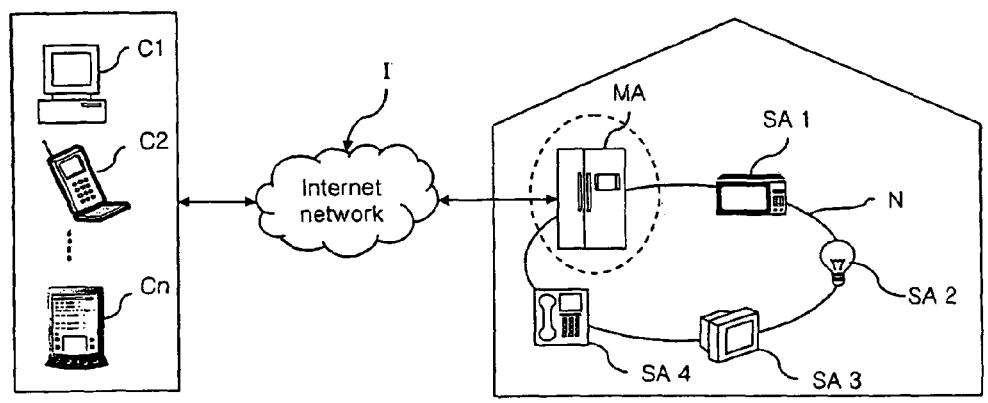
FIG. 1 is a view illustrating the configuration of a conventional network system.
Figure 2:
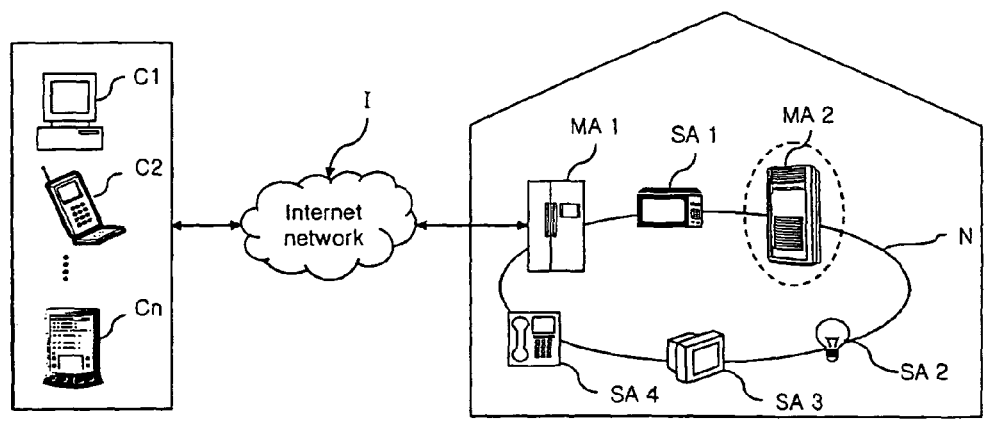
FIG. 2 is a view illustrating the configuration of a conventional network system connected with multiple master devices.
Figure 3:
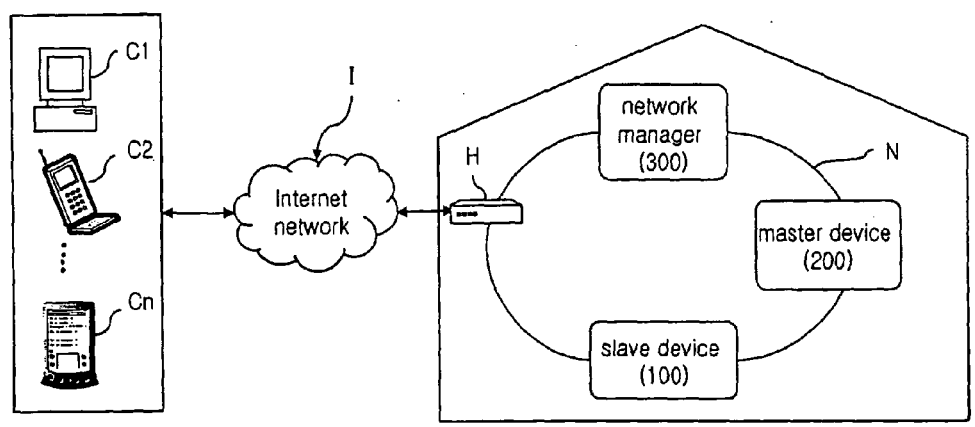
FIG. 3 is a schematic diagram illustrating a network system connected with multiple master devices in accordance with the present invention.

FIG. 3 is a schematic diagram illustrating a home-appliance network system connected with multiple master devices in accordance with the present invention.

As shown in FIG. 3, the home-appliance network system in accordance with the present invention includes a plurality of slave devices 100 (only one shown) connected to an internal network N. These slave devices 100 include but are not limited to, an electric light, a microwave oven, etc. It should be noted that any home-appliance can be a slave device 100 within the spirit and scope of the invention. The slave devices 100 control operations in response to control commands received through the internal network N. The system further includes at least one master device 200 for transmitting a control command to a corresponding slave device in response to the control command needed for controlling the slave devices 100, and receiving and transmitting state information of the slave devices 100. The master device 200 can take the form of any home appliance having a microcomputer capable of processing large-capacity data such as an Internet-based refrigerator, and a memory for storing data. However, any home appliance can be a master device 200 within the scope and spirit of the invention.

The network system assigns unique addresses to the slave devices 100 and the master device 200 such that they can be individually identified. The network system manages connection states of home appliances associated with the network as being one of a new connection, an additional connection and connection release (i.e., disconnection). It should be appreciated that any type of change in connection is within the spirit and scope of the present invention. The network system includes a network manager 300 for controlling and managing a flow of data transmitted and received through the internal network N. Where the network manager 300 is implemented by an independent device, it can be connected to the internal network N. Alternatively, where the network manager 300 is implemented by a built-in module, a specific home appliance having the built-in module, which functions as the network manager 300, is connected to the network N such that the network management can be performed.

The network system connected with the multiple master and slave devices in accordance with the present invention is connected to the internal network N and an Internet network I such that the home appliances connected to the Internet network I can be remotely controlled. In order for the home appliances to be remotely controlled (through devices C1-Cn), the network manager 300 can further include a hub H coupled to the slave and master devices 100 and 200 through, for example, the network N, having the assigned unique addresses. A gateway (not shown) coupled to the hub H converts communication protocols of the internal network N into appropriate protocols of the external Internet network I and vice versa.

The network manager will be described in detail with reference to FIG. 4, which is a view illustrating an internal configuration of the network manager in accordance with the present invention.

The network manager 300 basically includes a master-device discrimination unit 310, a search packet transmitter 320 and an address notification unit 335. The network manager 300 further includes a counter 350 and a data packet transmitter 360.

Figure 4:
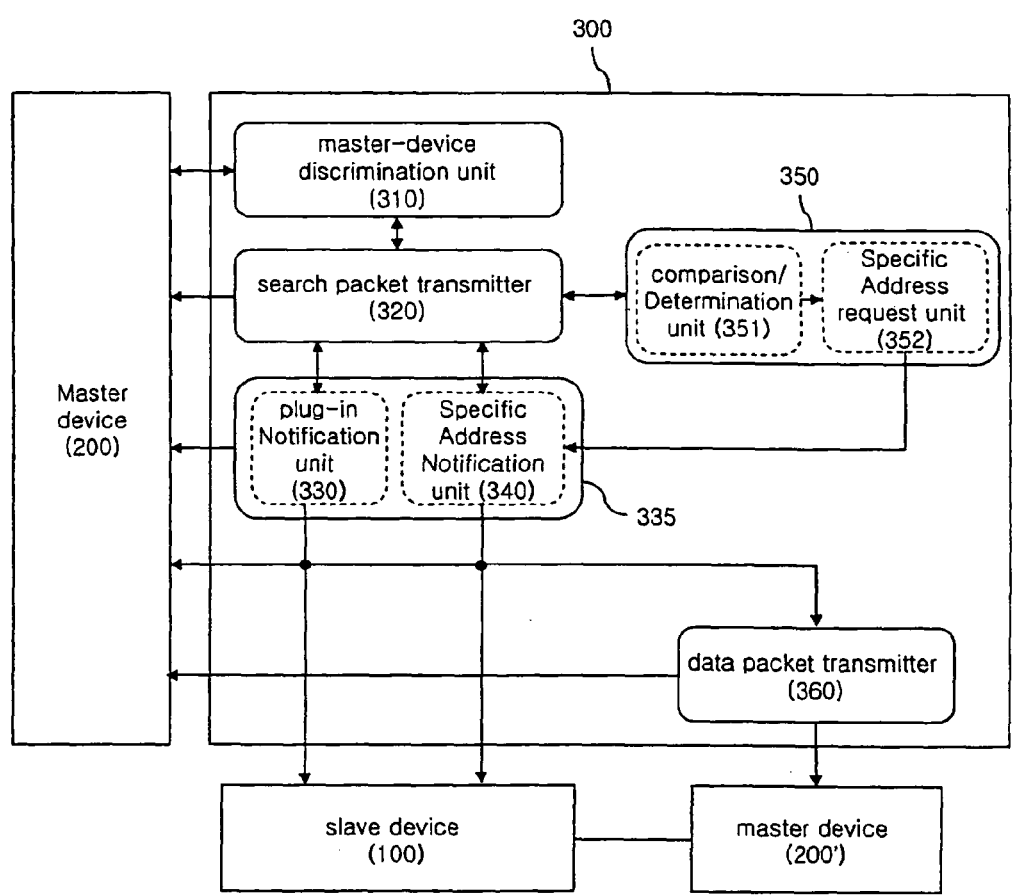
FIG. 4 is a view illustrating an internal configuration of a network manager in accordance with the present invention.

Two master devices 200 and 200' are shown in FIG. 4. The master device 200 is newly connected to the network, and the master device 200' is an existing device already connected to the network.

The master-device discrimination unit 310 determines whether the new master device 200 is first connected to the network (i.e., connecting to a network being established) or additionally connected (i.e., connecting to an existing network) to the network. Further, the master-device discrimination unit 310 determines whether a unique address is associated with the new master device 200.

If the master-device discrimination unit 310 determines that the unique address is associated (or embedded) with the new master device 200, the search packet transmitter 320 generates a search packet for searching for the unique address and then transmits the generated search packet to the new master device 200.

It should be noted that, although the term "packet" is used, any form of network communication is within the scope and spirit of the present invention.

The address notification unit 335 transmits the unique address of the new master device 200 found by the search packet generated by the search packet transmitter 320 to all home appliances 100 and 200' connected to the network, thereby notifying the home appliances 100 and 200' that the new master device 200 has been newly connected to the network. The address notification unit 335 includes a plug-in notification unit 330 and a specific address notification unit 340.

More specifically, if the unique address of the new master device 200 is searched for by the search packet, and found the plug-in notification unit 330 receives the unique address 200 of the master device. The notification unit then transmits the received unique address to all home appliances 100 and 200' connected to the network N, thereby notifying the home appliances that the new master device 200 has been plugged into the network N.

On the other hand, where the search for the unique address fails or is impossible, although the search packet transmitter 320 has transmitted the search packet, the specific address notification unit 340 automatically generates a specific address not identical with other addresses of the home appliances 100 and 200' connected to the network. The specific address notification unit 340 further assigns the generated address to the new master device 200. Thus, the specific address notification unit 340 transmits a specific address notification packet to all home appliances 100 and 200' connected to the network N in order to notify them that the new master device 200 having the generated specific address has been connected to the network N.

The network manager 300 further includes the counter 350 and the data packet transmitter 360. The counter 350 includes a comparison/determination unit 351 for determining the failure (or impossibility) of the search of the unique address corresponding to the new master device 200, when the number of attempted searches exceeds a predetermined number of searches. Thereafter, a specific address request unit 352 will output a control signal to request the specific address notification unit 341 to automatically generate a specific address when an address search failure is determined by the comparison/determination unit 351. In this embodiment, the predetermined number of searches is three and three searches for the unique address can be sequentially attempted. The maximum number of address searches to be attempted can be changed to any value.

Where a home appliance newly connected to the network is a slave device 100, the specific address notification unit 340 automatically generates a specific address and then assigns the generated address to the slave device 100. A specific address notification packet, for the notification of the specific address assigned to the slave device, is transmitted to the master devices 200 and 200' connected to the network N such that they can identify a connection state of the slave device 100.

The network manager 300 further includes the data packet transmitter 360 that generates a data packet containing the state information of the master devices 200 and 200' and slave devices 100 connected to the network N. The network manager 300 further transmits the generated data packet to the new master device 200 newly connected to the network N and the existing master device 200' already connected to the network N, when the new master device 200 is additionally connected to the network N to which the existing master device 200' has already been connected. Thus, all master devices connected to the network N can identify a state of any device additionally connected to the network.

A method for operating the network system connected with the multiple master devices will be described with reference to first and second embodiments. The first embodiment corresponds to a situation when a master device is first connected to the network N when it is constructed. The second embodiment corresponds to a situation when another home appliance is additionally connected to the network N with which at least one master device has already been connected.

Figure 5:
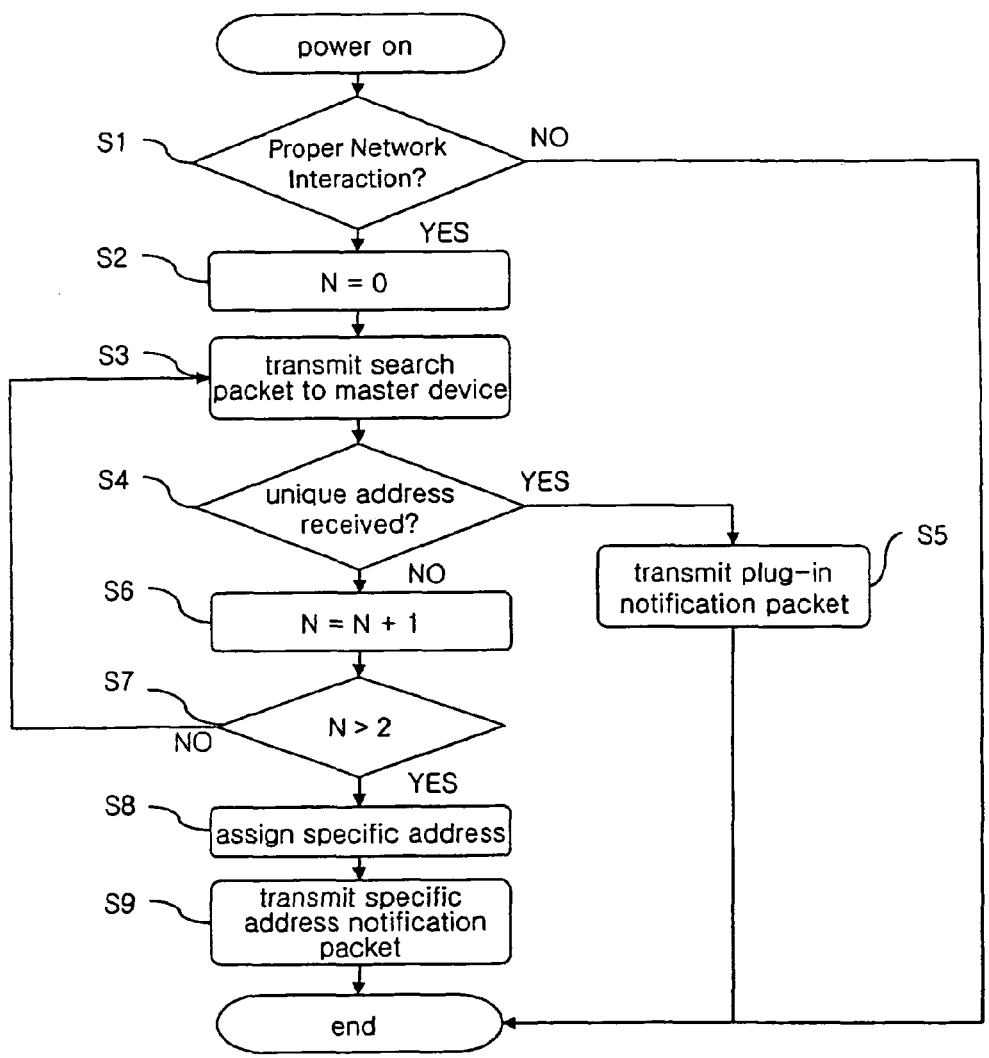
FIG. 5 is a flowchart illustrating a first embodiment of a method for operating the network system connected with the multiple master devices in accordance with the present invention.

FIG. 5 is a flowchart illustrating the first embodiment of the method for operating the network system connected with the multiple master devices in accordance with the present invention. If electric power is provided to a newly connected master device, the master-device discrimination unit determines whether a unique address is associated with the master device at step S1.

If the master device does not properly interact with the network, the master device is recognized as an abnormal device. Because the abnormal device cannot be appropriately plugged into a network, a connection procedure is terminated. On the other hand, if the master device does properly interact with the network, a parameter N, i.e., the number of attempted address searches is set to "0" at step S2. The search packet transmitter then transmits, to the master device, a search packet for searching for the unique address associated in the master device at step S3.

If the master device appropriately receives a unique address in response to the search packet from the search packet transmitter at step S4, the plug-in notification unit generates a plug-in notification packet to notify all home appliances connected to the network that the master device has been connected to the network, and transmits the generated plug-in notification packet to the home appliances at step S5. All home appliances connected to the network will recognize the new connection of the master device by receiving the plug-in notification packet.

If the search packet transmitter does not receive a response signal containing the unique address from the master device, it increments the number of address searches by "1" at step S6 and then tries to transmit the search packet, for example, for up to three times. If the search packet transmitter cannot identify the unique address of the master device in spite of the retransmissions of the search packet at step S7, the specific address notification unit automatically generates a specific address identifiable from other master devices connected to the network and newly assigns the generated specific address to the master device at step S8. The specific address notification unit transmits the newly assigned address to all home appliances connected to the network to now the home appliances of the newly assigned address at step S9.

As described above, a network address search and a setting task are automatically performed in order for the master device to be newly connected to the network.

Figure 6:
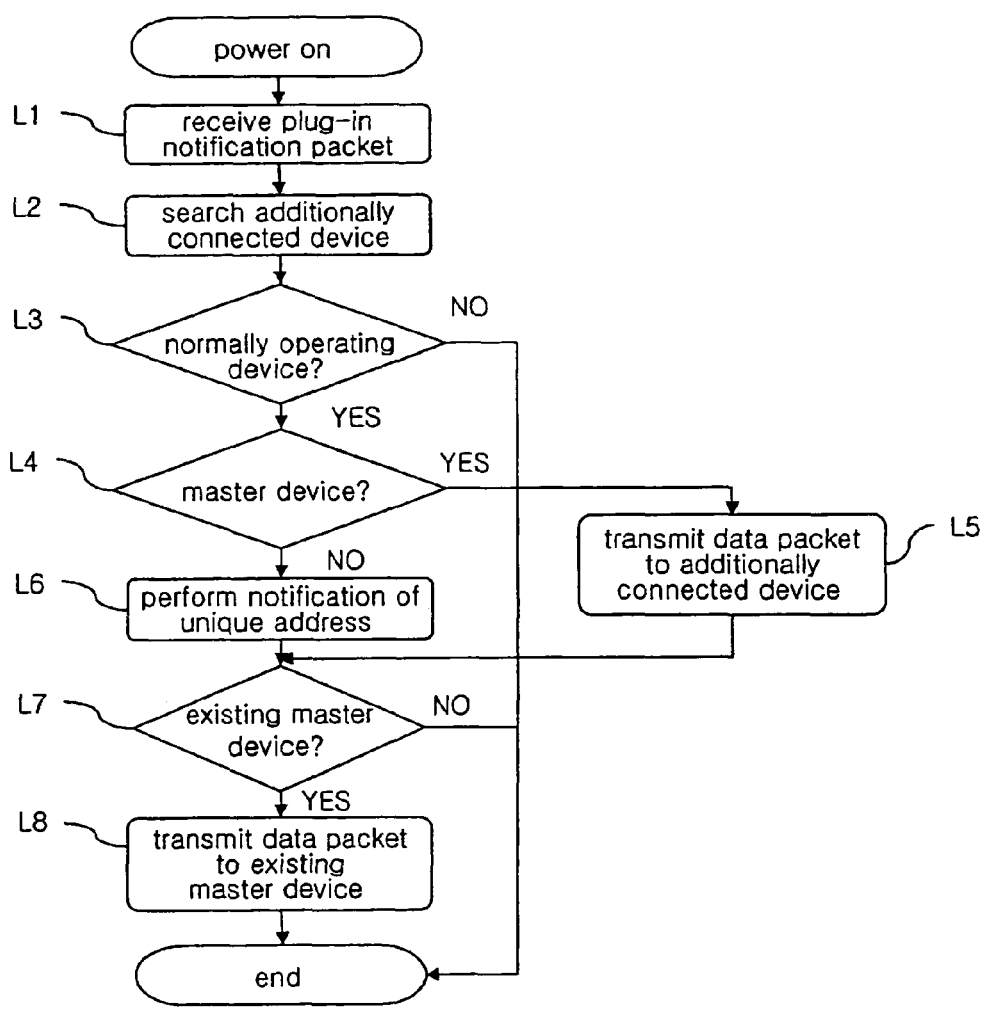
FIG. 6 is flowchart illustrating a second embodiment of the method for operating the network system connected with the multiple master devices in accordance with the present invention.

The second embodiment will be described with reference to FIG. 6. First a new home appliance is additionally connected to a network with which a plurality of slave devices and at least one existing master device are connected. The new home appliance can be a slave device or a master device.

If a unique address is associated with the additionally connected home appliance, a plug-in notification packet for the notification of the unique address is generated and transmitted to all home appliances connected to the network. If the search of the unique address associated with the additionally connected home appliance has failed, a specific address identifiable to other home appliances connected to the network is generated and assigned to the additionally connected home appliance.

The network manager receives the plug-in notification packet at step L1. The network manager transmits a search packet to the additionally connected home appliance and searches for state information of the home appliance at step L2.

It is determined, at step L3, whether the home appliance additionally connected to the network is operating appropriately. If the additionally connected home appliance is connected to the network and operating appropriately, at step L4 it is determined whether the additionally connected home appliance is a master device. If the additionally connected home appliance is determined to be the master device, as a result of the determination, a data packet containing state information of the slave device(s) connected to the network is transmitted to the additionally connected master device at step L5.

On the other hand, if the additionally connected home appliance is a slave device, the master device is notified of the unique address of the slave device connected to the network and the slave device is notified of the unique address of the master device. This is completed by a control signal output by the master device at step L6.

It is determined, at step L7, whether an existing master device is connected to the network. Where the existing master device and the additionally connected new master device are used together, the data packet indicating a connection state of the network is transmitted to the existing master device at step L8.

As described above, a network system connected with multiple master devices can be created and then a setting task is automatically performed.

As apparent from the above description, the present invention provides a network system connected with multiple master devices and a method for operating the same, wherein the system and method can additionally connect one or more master devices to the network, automatically perform a setting task, perform a rapid and cost-effective setting task and conveniently perform maintenance based on a state change of the network system. The method is performed when a home appliance is newly connected to a network constructed within a home or building or where a new home appliance is additionally connected to a network with which a plurality of home appliances are connected.

It should be further noted, that the present invention can operate in any network environment. Thus, it is within the spirit and scope of the present invention to operate in any suitable wired or wireless network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A network system, comprising:
    a plurality of network devices connected to a network; and
        a network manager having a processor and a memory to store instructions that, when executed by the processor, cause the processor to: manage network state information for managing and controlling the plurality of network devices included in the network,
        wherein the network state information includes a unique address uniquely assigned to devices included in the network for identifying each device in the network,
        determine, by a master-device discriminator of the network manager, whether at least one master device is newly connected to the network, and whether the unique address is associated with the at least one master device;
        generate, by a search packet transmitter of the network manager, a search packet for searching for the unique address associated with the at least one master device, and transmit the generated search packet to the at least one master device; and
        transmit, by an address notifier of the network manager, the unique address of the at least one master device to all other devices connected to the network,
        notify, by a plug-in notifier of the address notifier, all home appliances connected to the network of the unique address of the at least one master device when the unique address is searched for the at least one master device; and
        generate, by a specific address notifier of the address notifier, a specific address when the search of the unique address is not successful and transmit a specific address notification packet for the notification of the generated specific address to all other devices connected to the network.

2. A method for configuring a network including a plurality of network devices and a network manager managing the plurality of network devices, the method comprising:
    determining, by a master-device discriminator of the network manager, whether at least one master device is newly connected to the network,
    determining, by the master-device discriminator, whether a unique address is associated with the at least one master device;
    generating, by a search packet transmitter of the network manager, a search packet for searching for the unique address associated with the at least one master device,
    transmitting, by the search packet transmitter, the generated search packet to the at least one master device; and
    transmitting, by an address notifier of the network manager, the unique address of the at least one master device to all other devices connected to the network,
    wherein the unique address transmitting step comprises:
        notifying, by a plug-in notifier of the address notifier, all home appliances connected to the network of the unique address of the at least one master device when the unique address is searched for the at least one master device;
        generating, by a specific address notifier of the address notifier, a specific address when the search of the unique address is not successful; and transmitting, by the specific address notifier, a specific address notification packet for the notification of the generated specific address to all other devices connected to the network, wherein network state information for managing and controlling the plurality of network devices included in the network is managed by the network manager, and wherein the network state information includes the unique address uniquely assigned to devices included in the network for identifying each device in the network.

3. The method according to claim 2, wherein the plurality of network devices includes an original management device and at least one other device, and wherein the network state information is information that enables the at least one master device to assume network management duties from the original management device for the subsequent network management.

4. The network system according to claim 1, wherein the plurality of network devices includes an original management device and at least one other device, and wherein the network state information is information that enables the at least one master device to assume network management duties from the original management device for the subsequent network management.

5. A network managing device adapted to configure a network including a plurality of network devices, comprising:

a processor and memory to store instructions that, when executed by the processor, cause the processor to:

manage network state information for managing and controlling the plurality of network devices included in the network, wherein the network state information includes a unique address uniquely assigned to devices included in the network for identifying each device in the network, determine, by a master device discriminator of the network managing device, whether at least one master device is newly connected to the network, and whether the unique address is associated with the at least one master device;

generate, by a search packet transmitter network managing device, a search packet for searching for the unique address associated with the at least one master device, and transmit the generated search packet to the at least one master device;

transmit, by an address notifier network managing device, the unique address of the at least one master device to all other devices connected to the network notify, by a plug-in notifier of the address notifier, all home appliances connected to the network of the unique address of the at least one master device when the unique address is searched for the at least one master device; and generate, by a specific address notifier of the address notifier, a specific address when the search of the unique address is not successful and transmit a specific address notification packet for the notification of the generated specific address to all other devices connected to the network, wherein the plurality of network devices includes an original management device and at least one other device, and wherein the network state information is information that enables the at least one master device to assume network management duties from the original management device for the subsequent network management.

* * * * *